(12) United States Patent
Peng et al.

(10) Patent No.: US 9,896,843 B2
(45) Date of Patent: Feb. 20, 2018

(54) RECYCLING CONSTANT-TEMPERATURE CERAMIC FLOOR INTEGRATED SYSTEM

(71) Applicant: Fujian Lopo Terracotta Panels Manufacturing Co., Ltd., Zhangzhou (CN)

(72) Inventors: Xinghua Peng, Quanzhou (CN); Jinyi Wu, Xiamen (CN); Mousen Zhang, Quanzhou (CN)

(73) Assignee: FUJIAN LOPO TERRACOTTA PANELS MANUFACTURING, Zhangzhou (CN)

( * ) Notice: Subject to any disclaimer, the term of this patent is extended or adjusted under 35 U.S.C. 154(b) by 0 days.

(21) Appl. No.: 14/894,351

(22) PCT Filed: Nov. 7, 2013

(86) PCT No.: PCT/CN2013/001348
§ 371 (c)(1),
(2) Date: Nov. 26, 2015

(87) PCT Pub. No.: WO2014/190460
PCT Pub. Date: Dec. 4, 2014

(65) Prior Publication Data
US 2016/0115691 A1    Apr. 28, 2016

(30) Foreign Application Priority Data
May 29, 2013  (CN) .......................... 2013 1 0205657

(51) Int. Cl.
*F24D 15/00* (2006.01)
*E04C 2/52* (2006.01)
(Continued)

(52) U.S. Cl.
CPC .............. *E04C 2/525* (2013.01); *E04F 15/02* (2013.01); *E04F 15/08* (2013.01); *E04F 15/185* (2013.01);
(Continued)

(58) Field of Classification Search
CPC .......... F24D 3/141; F24D 3/127; F24D 3/148; F24D 3/142; E04F 2203/04; F28F 21/045; E04C 2/52
See application file for complete search history.

(56) References Cited

U.S. PATENT DOCUMENTS 2,799,481 A * 7/1957 Becker ............... B60H 1/00271
114/74 R
3,795,272 A * 3/1974 Kahn ........................ F24D 3/14
165/54
(Continued)

FOREIGN PATENT DOCUMENTS

CN      103062825 A    4/2013
CN      103267315 A    8/2013
(Continued)

OTHER PUBLICATIONS

International Search Report based on application No. PCT/CN2013/001348 (6 pages + 4 pages of English translation) dated Feb. 27, 2014.
(Continued)

*Primary Examiner* — Gisele D Ford
(74) *Attorney, Agent, or Firm* — Viering, Jentschura & Partner mbB

(57) ABSTRACT

Various embodiments may relate to a recycling constant-temperature ceramic floor integrated system, including a floor tile. A plurality of grooves is formed in a bottom surface of the floor tile. The bottom surface of the floor tile is connected to a base plate. A support assembly is laid
(Continued)

between each groove and the base plate. The support assembly includes a heat conducting piece and a locating support mounted in up-and-down lapping mode. A reflecting film is disposed between the heat conducting piece and the locating support. The base plate uses a net-structure plate piece, and buckle grooves and buckle blocks are disposed at the periphery of the base plate.

10 Claims, 3 Drawing Sheets

(51) Int. Cl.
| | | |
|---|---|---|
| *E04F 15/08* | (2006.01) | |
| *E04F 15/18* | (2006.01) | |
| *F24D 3/14* | (2006.01) | |
| *F24D 13/02* | (2006.01) | |
| *E04F 15/02* | (2006.01) | |

(52) U.S. Cl.
CPC ............ *F24D 3/14* (2013.01); *F24D 3/142* (2013.01); *F24D 13/022* (2013.01); *E04F 2015/02116* (2013.01); *E04F 2290/023* (2013.01); *Y02B 30/26* (2013.01)

(56) References Cited

U.S. PATENT DOCUMENTS

| | | | | |
|---|---|---|---|---|
| 4,635,710 A * | 1/1987 | Shelley | ............. | F24D 3/165 165/171 |
| 4,759,402 A * | 7/1988 | Osojnak | ............. | F24D 3/165 165/171 |
| 4,766,951 A * | 8/1988 | Bergh | ............. | F24D 3/165 165/171 |
| 5,042,569 A * | 8/1991 | Siegmund | ............. | F24D 3/143 165/49 |
| 5,454,428 A * | 10/1995 | Pickard | ............. | F24D 3/148 165/178 |
| 5,597,033 A * | 1/1997 | Cali | ............. | F24D 19/04 165/171 |
| 5,829,516 A * | 11/1998 | Lavochkin | ............. | F28F 1/22 165/171 |
| 5,862,854 A * | 1/1999 | Gary | ............. | F28F 21/063 165/171 |
| 5,879,491 A * | 3/1999 | Kobayashi | ............. | E04F 15/12 156/280 |
| 6,095,235 A * | 8/2000 | Kongsgaard | ............. | A01K 1/0158 119/508 |
| 6,220,523 B1 * | 4/2001 | Fiedrich | ............. | F24D 3/14 237/69 |
| 6,283,382 B1 * | 9/2001 | Fitzemeyer | ............. | F24D 3/141 165/49 |
| 6,330,980 B1 * | 12/2001 | Fiedrich | ............. | F24D 3/14 165/53 |
| 6,726,115 B1 * | 4/2004 | Chiles | ............. | F24D 3/14 165/49 |
| 6,910,526 B1 * | 6/2005 | Sokolean | ............. | F24D 3/165 165/135 |
| 6,969,832 B1 * | 11/2005 | Daughtry, Sr. | ......... | F24D 3/141 219/531 |
| 7,021,372 B2 * | 4/2006 | Pickard | ............. | F24D 3/141 165/168 |
| 7,832,159 B1 * | 11/2010 | Kayhart | ............. | E04F 19/06 126/662 |
| 7,900,416 B1 * | 3/2011 | Yokubison | ............. | E04F 15/10 52/177 |
| 8,256,690 B2 * | 9/2012 | Newberry | ............. | F24D 3/165 165/48.1 |
| 8,382,004 B2 * | 2/2013 | Asmussen | ............. | F28F 13/18 237/69 |
| 8,499,823 B1 * | 8/2013 | Shaw | ............. | F24D 3/16 165/171 |
| 8,650,832 B2 * | 2/2014 | Fiedrich | ............. | E04C 2/525 165/49 |
| 8,881,476 B2 * | 11/2014 | Sullivan | ............. | F24D 3/141 165/56 |
| 9,091,489 B2 * | 7/2015 | Morin | ............. | B64G 1/503 |
| 9,404,665 B1 * | 8/2016 | Kayhart | ............. | F24D 3/14 |
| 2004/0026525 A1 * | 2/2004 | Fiedrich | ............. | F24D 3/142 237/69 |
| 2006/0288651 A1 * | 12/2006 | Zeng | ............. | E04F 15/06 52/177 |
| 2007/0017656 A1 * | 1/2007 | Da Rold | ............. | F24D 3/125 165/48.1 |
| 2008/0017725 A1 * | 1/2008 | Backman, Jr. | ......... | F24D 3/142 237/69 |
| 2008/0083833 A1 * | 4/2008 | Blanke | ............. | E04F 15/18 237/69 |
| 2008/0148673 A1 * | 6/2008 | Keller | ............. | F24D 3/142 52/592.1 |
| 2008/0164005 A1 * | 7/2008 | Keller | ............. | F24D 3/142 165/49 |
| 2009/0294601 A1 * | 12/2009 | Pedersen | ............. | F16L 3/13 248/74.1 |
| 2009/0314848 A1 * | 12/2009 | Andersson | ............. | F24D 3/142 237/71 |
| 2010/0071873 A1 * | 3/2010 | Campagna | ............. | F24D 3/16 165/56 |
| 2010/0116947 A1 * | 5/2010 | Winkler | ............. | F16L 3/06 248/73 |
| 2010/0237157 A1 * | 9/2010 | Guo | ............. | E04F 15/02 237/69 |
| 2010/0300028 A1 * | 12/2010 | Huxtable | ............. | B65G 1/02 52/503 |
| 2012/0103580 A1 * | 5/2012 | Buttignol | ............. | F24D 3/125 165/169 |
| 2013/0340364 A1 * | 12/2013 | Haselmeier | ............. | E04C 2/52 52/220.2 |
| 2015/0013259 A1 * | 1/2015 | Masanek, Jr. | ...... | E04F 15/02005 52/396.04 |
| 2015/0136361 A1 * | 5/2015 | Gregory | ............. | F24J 2/243 165/104.19 |
| 2015/0225962 A1 * | 8/2015 | Hancock | ............. | E04F 13/0841 52/468 |

FOREIGN PATENT DOCUMENTS

| | | |
|---|---|---|
| CN | 203347181 U | 12/2013 |
| CN | 203385065 U | 1/2014 |
| CN | 203385082 U | 1/2014 |
| CN | 203385085 U | 1/2014 |
| CN | 203385086 U | 1/2014 |
| JP | 2001020510 A | 1/2001 |
| JP | 2002221328 A | 8/2002 |
| JP | 3660350 B1 | 6/2005 |
| KR | 20130042515 A | 4/2013 |

OTHER PUBLICATIONS

European Search Report based on application No. 13885755.2 (7 pages) dated Feb. 10, 2017 (for reference purpose only).

* cited by examiner

RECYCLING CONSTANT-TEMPERATURE CERAMIC FLOOR INTEGRATED SYSTEM

RELATED APPLICATIONS

The present application is a national stage entry according to 35 U.S.C. § 371 of PCT application No.: PCT/CN2013/001348 filed on Nov. 7, 2013 which claims priority from Chinese application No.: 201310205657.7 filed on May 29, 2013, and is incorporated herein by reference in its entirety.

TECHNICAL FIELD

Various embodiments relate to building materials, and more particularly to a recycling constant-temperature ceramic floor integrated system.

BACKGROUND

With the development of indoor heating devices, people increasingly use floor heating. Floor heating is an abbreviated form of radiant floor heating, which heat the entire floor by using the floor as a radiator and dispreading heat through the heat medium arranged in the radiating layer of the floor. Since the floor in nature can accumulate heat and radiate heat upward, it can be heated evenly. The existing floor heating methods include water floor heating and electric floor heating. Water floor heating uses warm water (not hotter than 60° C.) as the heat medium. When the warm water circulates in the heating pipe installed in a filling layer embedded into the ground, the floor above the heating pipe can be heated. Electric floor heating, on the other hand, has a heating cable whose outer surface is not hotter than 65° C. embedded under the floor. The heating cable serves as a heat source to heat the floor through terrestrial surface radiation. The present approaches to installing floor heating systems are technically complicated and require considerable site operation. Besides, before concrete sets, there is a risk that the components laid get damaged. The conventional floor heating tile is made of polystyrene sheet or foamed material and tends to tilt before concrete sets, making it difficult to install the heat conducting pipe. Even when the floor heating tile contacts the set concrete, the heat conducting effect therebetween is poor and likely to have heat loss, hindering heat supply. Besides, the conventional floor heating tile has a large overall thickness, and in the event that any pipe or wire breakdown happens therein, maintenance and repair would be a challenge. Hence, there is a need for a floor integrated system that is adaptable to both water heating use and floor heating use, with quick heating, easy adaption, convenient maintenance and repair, and simple installation.

SUMMARY

The objective of the present disclosure is to overcome the foregoing shortcomings by providing a recycling constant-temperature ceramic floor integrated system featuring high resource utilization, convenient installation, and dual-purpose usage.

For achieving the aforementioned objective, the present disclosure implements the following technical solutions: a recycling constant-temperature ceramic floor integrated system, including a floor tile. The floor tile has a bottom surface formed with a plurality of grooves and is connected to a base plate. A support assembly is arranged between the grooves and the base plate. The support assembly includes a heat conducting piece and a positioning support mounted in an up-and-down lapping mode.

Preferably, a reflecting film is arranged between the heat conducting piece and the positioning support.

Preferably, the positioning support is a rectangular cross-sectional hollow profile, and has lower parts at two laterals thereof provided with positioning and heat-dissipating fins.

Preferably, the heat conducting piece is a semicircular cross-sectional profile. The heat conducting piece has an inner wall at two ends thereof provided with positioning steps and positioning wedges and has outer wall at a middle part thereof provided with a chase for fittingly receiving an external heat conducting cable.

Preferably, the positioning support has upper parts at two laterals thereof provided with retaining troughs for engaging with the positioning wedges.

Preferably, the heat conducting piece is a tubular profile for hot water to circulate therein and conduct heat.

Preferably, the base plate is a net-structure plate piece that has a top surface thereof provided with a plurality of positioning notches and has a periphery thereof provided with buckle sockets and buckle blocks.

Preferably, each of the buckle blocks (31) is of a T-shaped tenon, and each of the buckle sockets is a T-shaped mortise that meshes with the corresponding buckle block.

Preferably, the floor tile has a middle part thereof provided with a plurality of square cross-sectional hollow-out portions.

Preferably, the groove has a U-shaped cross-section.

With the foregoing technical schemes adopted, the present disclosure has the following beneficial effects. In use, plural base plates are connected, and the support assembly is arranged between each corresponding set of the floor tile and the base plate. The support assembly may be adapted to water heating use or electric heating use through convenient adapting operation. The system is composed of modularized components, so is easy to assemble/disassemble and maintenance/repair. The support assembly includes the positioning support that contributes to heat insulation, sound insulation and moisture prevention. With the positioning and heat-dissipating fins combined closely with the positioning notches of the base plate, the assembled system is prevented from slide, displacement and separation. The assembled system is firm and compact and eliminates the risk of deviation and uneven distribution of pipes caused by manual positioning during construction. Furthermore, the system has the reflecting film arranged in the support assembly, so as to effectively prevent overall heat energy from flowing away and in turn enhance heat utilization. The structural module can be disassembled to have the components replaced easily for water heating and electric heating applications without generating any construction waste. The floor tile structure is recyclable and reusable, and really breaks the limit of the conventional floor heating structure that is only applicable to one of water heating use and electric heating use, making the product versatile, inexpensive to manufacture, and easy to repair, thereby well satisfying users' need.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The disclosure as well as a preferred mode of use, further objectives and advantages thereof will be best understood by reference to the following detailed description of illustrative embodiments when read in conjunction with the accompanying drawings.

Figure 1:
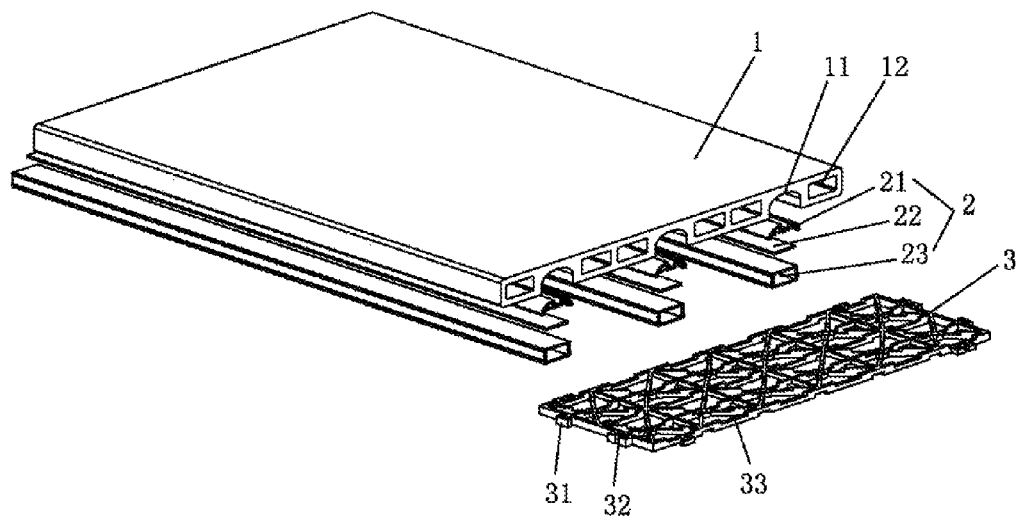
FIG. 1 is a partly exploded view of Embodiment 1 of the present disclosure.
Figure 2:
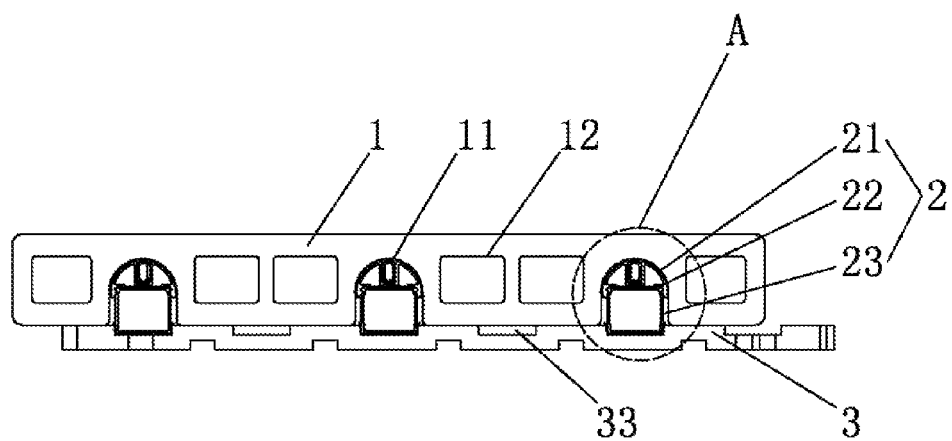
FIG. 2 is a main structural view of Embodiment 1 of the present disclosure.

Referring to FIG. 1 and FIG. 2, in a first embodiment, the present disclosure provides a floor integrated system for working with an electric heating device. The system includes a floor tile 1. The floor tile 1 has its bottom surface formed with a plurality of grooves 11 that are spaced and extend in parallel. Each of the grooves 11 has a U-shaped cross-section. The floor tile 1 has its middle part provided with a plurality of square cross-sectional hollow-out portion 12, so as to effectively reduce weight and save material used. The floor tile 1 has its bottom surface connected to a base plate 3. Between each of the grooves 11 and the base plate 3, there is a support assembly 2 arranged. The support assembly 2 includes a heat conducting piece 21 and a positioning support 23 mounted in an up-and-down lapping mode. Between the heat conducting piece 21 and the positioning support 23, there is a reflecting film 22 arranged. The reflecting film 22 may be a piece of aluminum foil or aluminum oxide film, so as to effectively reflect and retain the heat generated inside the heat conducting piece 21, thereby preventing overall heat energy from flowing away and thereby enhancing heat utilization. Therein, the positioning support 23 is a rectangular cross-sectional hollow profile. The hollow profile may be made of aluminum or stainless steel or aluminum alloy, provided it is light in weight, firm in structure, and versatile. The base plate 3 is a net-structure plate piece, and has its top surface provided with a plurality of spaced positioning notches 33 that correspond to the grooves 11 of the floor tile 1, thereby effectively positioning the support assembly 2 from above and from below. Such structural positioning eliminates the risk of deviation and uneven distribution of pipes caused by manual positioning during construction. The base plate 3 has its periphery provided with buckle sockets 32 and buckle blocks 31. The buckle block 31 is a T-shaped tenon, and the buckle socket 32 is a T-shaped mortise that meshes with the corresponding buckle block 31. Thereby plural base plates 3 can be connected in multiple directions, so as to realize modularized installation that features accurate positioning, reduced installation time, convenient operation and high quality result.

Figure 3:
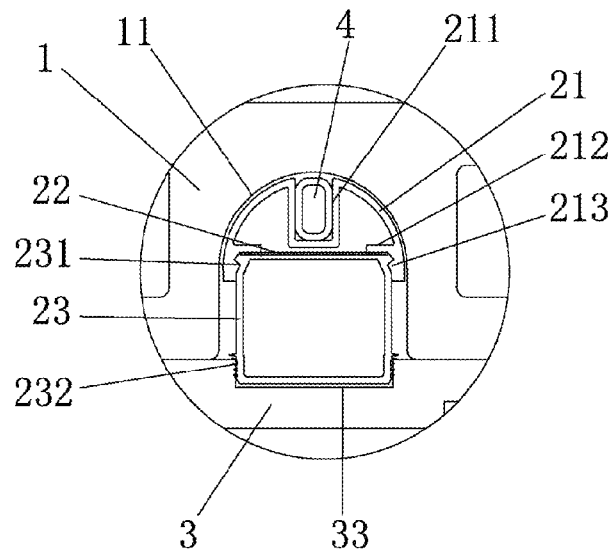
FIG. 3 is a close-up view of Area A of FIG. 2.

As shown in FIG. 3, the heat conducting piece 21 is a semicircular cross-sectional profile, with its outer top surface fittingly nesting along the inner wall of the corresponding groove 11. The heat conducting piece 21 has the inner wall at the two ends of its semicircular structure provided with positioning steps 212 and positioning wedges 213, and has the outer wall at its middle part provided with a chase 211, for fittingly receiving an external heat conducting cable 4, so that the heat conducting cable 4 can contact tightly with the bottom surface of the floor tile 1, thereby maximizing heat radiation and ensuring good warmth keeping. The positioning support 23 has lower parts of its two laterals provided with positioning and heat-dissipating fins 232 that are configured to be fittingly received in the positioning notches 33 of the base plate 3. The positioning support 23 has upper parts of its two laterals provided with retaining troughs 231 that correspond to the positioning wedges 213. The positioning steps 212 of the heat conducting piece 21 and the upper surface of the positioning support 23 abut against and thereby retain each other. In addition, with the combination between the positioning wedges 213 and the retaining troughs 231, the heat conducting piece 21 and the positioning support 23 are assembled firmly. The reflecting film 22 arranged between the conducting piece 21 and the positioning support 23 further enhance overall combination. Moreover, the modularized installation is convenient to perform and ensures easy repair and replacement in the future. The replaced components can be recycled, making the system favorable to environmental protection and resource conservation.

Figure 4:
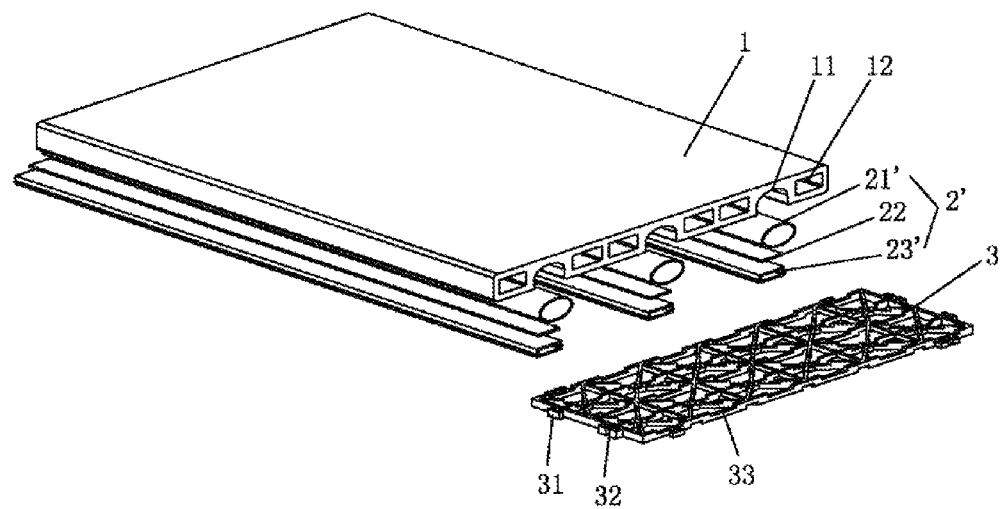
FIG. 4 is a partly exploded view of Embodiment 2 of the present disclosure.
Figure 5:
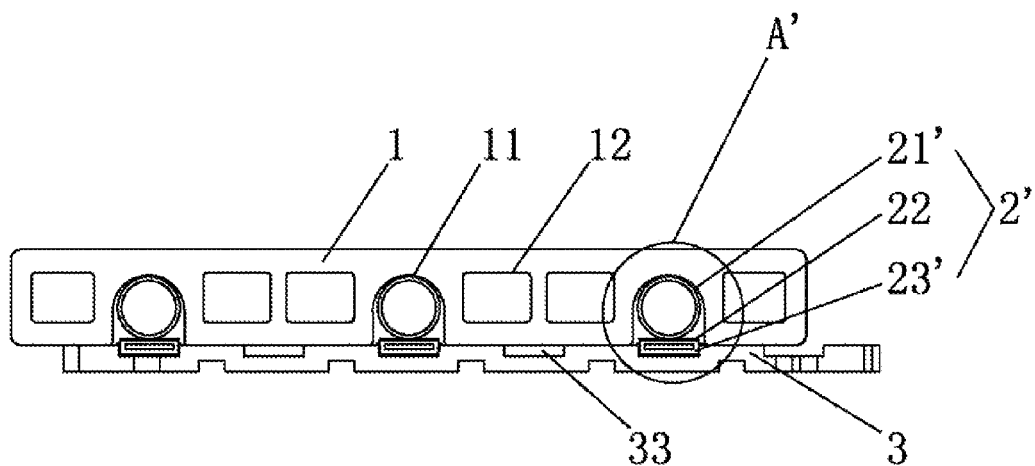
FIG. 5 is a main structural view of Embodiment 2 of the present disclosure.

As shown in FIG. 4 and FIG. 5, in a second embodiment, the present disclosure provides a floor integrated system working with a water heating device. The system includes a floor tile 1, a support assembly 2' and a base plate 3. The floor tile 1 and the base plate 3 are identical to their counterparts in the first embodiment, so the signal structural design are applicable to both electric heating and water heating modules, making the entire system featuring reduced components, high price-performance ratio, and possibility of convenient after service.

Figure 6:
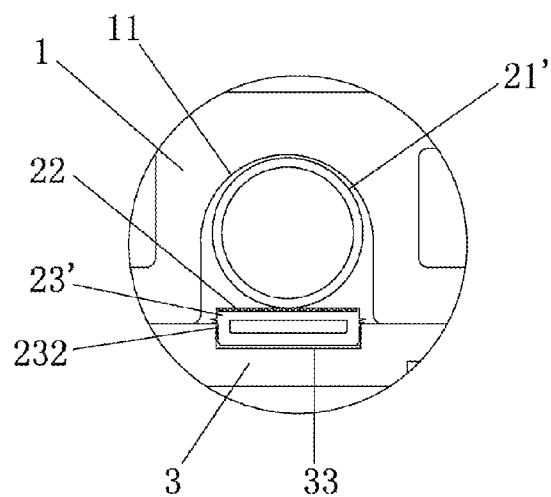
FIG. 6 is a close-up view of Area A' of FIG. 5.

As shown in FIG. 6, the support assembly 2' includes a heat conducting piece 21' and a positioning support 23'. Between the heat conducting piece 21' and the positioning support 23' there is also a reflecting film 22 arranged for heat insulation and warmth keeping. The heat conducting piece 21' is a tubular profile for hot water to circulate therein and conduct heat. The positioning support 23' is a rectangular cross-sectional hollow profile having a relatively small thickness. It has lower parts at two laterals thereof provided with positioning and heat-dissipating fins 232 that are also configured to be fittingly received in the positioning notches 33 of the base plate 3. By changing only two components, the system can be shifted from electric heating use to water heating use. The structural module can be disassembled to have the components replaced easily without generating any construction waste. Moreover, the floor tile structure can be recycled and reused. With the disclosed system, a floor heating structure can be used for both water heating and electric heating applications, making the product versatile and inexpensive to manufacture. Other advantages of the present disclosure includes convenient repair, easy installation, low frictional loss among components, high heat-transmitting capacity, good thermal and pressure resistance, excellent low temperature resistance, hot-cool dual purpose, superior qualitative stability and impact resistance, as well as promising market prospect.

The present disclosure has been described with reference to the preferred embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. A recycling constant-temperature ceramic floor integrated system, comprising a floor tile,
    wherein the floor tile has a bottom surface formed with a plurality of grooves and is connected to a base plate,
    wherein the floor tile has a middle part thereof provided with a plurality of square cross-sectional hollow-out portions,
    wherein a support assembly is arranged between the grooves and the base plate, and the support assembly includes a heat conducting piece and a positioning support mounted in an up-and-down lapping mode, and
    wherein the positioning support is a rectangular cross-sectional hollow profile, and has lower parts at two laterals thereof provided with positioning and heat-dissipating fins.

2. The recycling constant-temperature ceramic floor integrated system of claim 1, wherein a reflecting film is arranged between the heat conducting piece and the positioning support.

3. The recycling constant-temperature ceramic floor integrated system of claim 1, wherein the heat conducting piece is a semicircular cross-sectional profile, and wherein the heat conducting piece has an inner wall at two ends thereof provided with positioning steps and positioning wedges and has an outer wall at a middle part thereof provided with a chase for fittingly receiving an external heat conducting cable.

4. The recycling constant-temperature ceramic floor integrated system of claim 3, wherein the positioning support has upper parts at two laterals thereof provided with retaining troughs for engaging with the positioning wedges.

5. The recycling constant-temperature ceramic floor integrated system of claim 1, wherein the heat conducting piece is a tubular profile for hot water to circulate therein and conduct heat.

6. The recycling constant-temperature ceramic floor integrated system of claim 1, wherein the base plate is a net-structure plate piece that has a top surface thereof provided with a plurality of positioning notches and has a periphery thereof provided with buckle sockets and buckle blocks.

7. The recycling constant-temperature ceramic floor integrated system of claim 6, wherein each of the buckle blocks is of a T-shaped tenon, and each of the buckle sockets is a T-shaped mortise that meshes with the corresponding buckle block.

8. The recycling constant-temperature ceramic floor integrated system of claim 1, wherein the groove has a U-shaped cross-section.

9. A recycling constant-temperature ceramic floor integrated system, comprising a floor tile,
    wherein the floor tile has a bottom surface formed with a plurality of grooves and is connected to a base plate,
    wherein the floor tile has a middle part thereof provided with a plurality of square cross-sectional hollow-out portions,
    wherein a support assembly is arranged between the grooves and the base plate, and the support assembly includes a heat conducting piece and a positioning support mounted in an up-and-down lapping mode, and
    wherein the positioning support is a rectangular cross-sectional hollow profile, and has lower parts at two laterals thereof provided with positioning and heat-dissipating fins.

10. A recycling constant-temperature ceramic floor integrated system, comprising a floor tile,
    wherein the floor tile has a bottom surface formed with a plurality of grooves and is connected to a base plate,
    wherein the floor tile has a middle part thereof provided with a plurality of square cross-sectional hollow-out portions,
    wherein a support assembly is arranged between the grooves and the base plate, and the support assembly includes a heat conducting piece and a positioning support mounted in an up-and-down lapping mode, and
    wherein the base plate is a net-structure plate piece that has a top surface thereof provided with a plurality of positioning notches and has a periphery thereof provided with buckle sockets and buckle blocks.

* * * * *